United States Patent [19]
Kobas

[11] Patent Number: 5,865,489
[45] Date of Patent: Feb. 2, 1999

[54] BAKING UTENSIL

[76] Inventor: George L. Kobas, 2532 Mackenzie Street, Vancouver, B.C., Canada, V6K 3Z7

[21] Appl. No.: 903,207

[22] Filed: Jul. 21, 1997

[51] Int. Cl.⁶ .................................................. A47J 45/10
[52] U.S. Cl. .................................................. 294/29; 294/3
[58] Field of Search ................................ 294/3, 7, 8, 9, 294/10, 12, 13, 27.1, 28, 29, 30, 31.1, 32

[56] References Cited

U.S. PATENT DOCUMENTS

| | | | |
|---|---|---|---|
| 156,563 | 11/1874 | Goodrich et al. | 294/29 |
| 446,114 | 2/1891 | Ericson | 294/27.1 |
| 1,541,738 | 6/1925 | Peyton | 294/29 |
| 1,824,562 | 9/1931 | Muhlichen | 294/29 |
| 2,137,458 | 11/1938 | Phelps | 294/7 |
| 2,733,947 | 2/1956 | Platt | 294/29 |
| 3,598,438 | 8/1971 | Taft | 294/29 |

FOREIGN PATENT DOCUMENTS

| | | | |
|---|---|---|---|
| 18666 | 2/1929 | Australia | 294/29 |
| 455126 | 10/1936 | United Kingdom | 294/31.1 |

*Primary Examiner*—Dean Kramer

[57] ABSTRACT

A new baking utensil for the handling of bakery pans, and particularly for the handling of pizza pans. The inventive device includes an elongate lower arm with a pan supporting end region having a notch being for accepting a lip of a pan. Extending from the pan supporting end region is a pan stopping flange. An elongate upper arm having a pan grabbing end region at one end is pivotally coupled to the lower arm at its other end so that the upper arm is pivotable between an open position and a closed position. Extending from the pan grabbing end region is a pan grabbing flange which is positioned in relation to the pan stopping flange such that a lip extending from a pan is held between the pan grabbing flange and the pan stopping flange when the upper arm is positioned in the closed position.

20 Claims, 3 Drawing Sheets

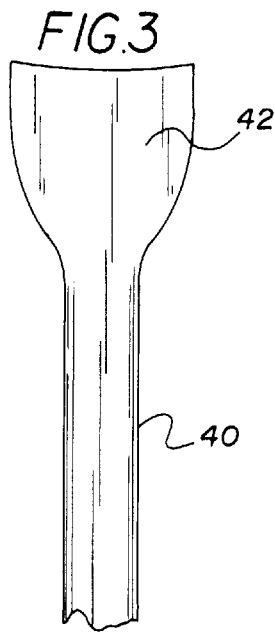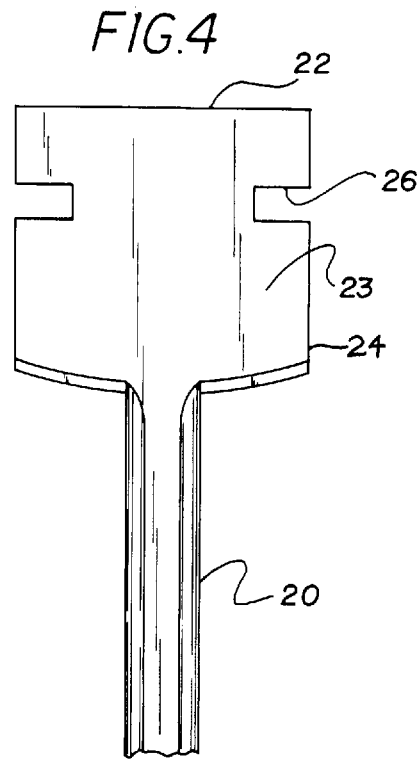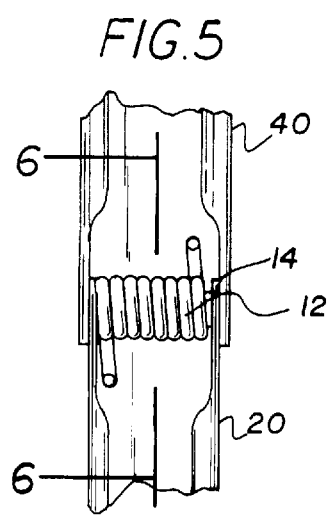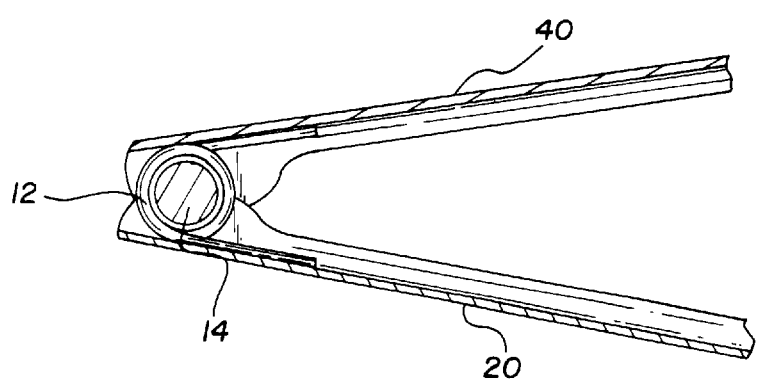

5,865,489

BAKING UTENSIL

BACKGROUND OF THE INVENTION

1. Field of the Invention

The present invention relates to cooking utensils and more particularly pertains to a new baking utensil for the handling of bakery pans, and particularly for the handling of pizza pans.

2. Description of the Prior Art

The use of cooking utensils is known in the prior art. More specifically, cooking utensils heretofore devised and utilized are known to consist basically of familiar, expected and obvious structural configurations, notwithstanding the myriad of designs encompassed by the crowded prior art which have been developed for the fulfillment of countless objectives and requirements.

Known prior art cooking utensils include U.S. Pat. No. 4,753,472; U.S. Pat. No. 5,104,166; U.S. Pat. No. Des. 246,087; U.S. Pat. No. 5,213,384; U.S. Pat. No. 5,417,463; and U.S. Pat. No. Des. 306,115.

While these devices fulfill their respective, particular objectives and requirements, the aforementioned patents do not disclose a new baking utensil. The inventive device includes an elongate lower arm with a pan supporting end region having a notch being for accepting a lip of a pan. Extending from the pan supporting end region is a pan stopping flange. An elongate upper arm having a pan grabbing end region at one end is pivotally coupled to the lower arm at its other end so that the upper arm is pivotable between an open position and a closed position. Extending from the pan grabbing end region is a pan grabbing flange which is positioned in relation to the pan stopping flange such that a lip extending from a pan is held between the pan grabbing flange and the pan stopping flange when the upper arm is positioned in the closed position.

In these respects, the baking utensil according to the present invention substantially departs from the conventional concepts and designs of the prior art, and in so doing provides an apparatus primarily developed for the purpose of the handling of bakery pans, and particularly for the handling of pizza pans.

SUMMARY OF THE INVENTION

In view of the foregoing disadvantages inherent in the known types of cooking utensils now present in the prior art, the present invention provides a new baking utensil construction wherein the same can be utilized for the handling of bakery pans, and particularly for the handling of pizza pans.

The general purpose of the present invention, which will be described subsequently in greater detail, is to provide a new baking utensil apparatus and method which has many of the advantages of the cooking utensils mentioned heretofore and many novel features that result in a new baking utensil which is not anticipated, rendered obvious, suggested, or even implied by any of the prior art cooking utensils, either alone or in any combination thereof.

To attain this, the present invention generally comprises an elongate lower arm with a pan supporting end region having a notch being for accepting a lip of a pan. Extending from the pan supporting end region is a pan stopping flange. An elongate upper arm having a pan grabbing end region at one end is pivotally coupled to the lower arm at its other end so that the upper arm is pivotable between an open position and a closed position. Extending from the pan grabbing end region is a pan grabbing flange which is positioned in relation to the pan stopping flange such that a lip extending from a pan is held between the pan grabbing flange and the pan stopping flange when the upper arm is positioned in the closed position.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature an essence of the technical disclosure of the application. The abstract is neither intended to define the invention of the application, which is measured by the claims, nor is it intended to be limiting as to the scope of the invention in any way.

It is therefore an object of the present invention to provide a new baking utensil apparatus and method which has many of the advantages of the cooking utensils mentioned heretofore and many novel features that result in a new baking utensil which is not anticipated, rendered obvious, suggested, or even implied by any of the prior art cooking utensils, either alone or in any combination thereof.

It is another object of the present invention to provide a new baking utensil which may be easily and efficiently manufactured and marketed.

It is a further object of the present invention to provide a new baking utensil which is of a durable and reliable construction.

An even further object of the present invention is to provide a new baking utensil which is susceptible of a low cost of manufacture with regard to both materials and labor, and which accordingly is then susceptible of low prices of sale to the consuming public, thereby making such baking utensil economically available to the buying public.

Still yet another object of the present invention is to provide a new baking utensil which provides in the apparatuses and methods of the prior art some of the advantages thereof, while simultaneously overcoming some of the disadvantages normally associated therewith.

Still another object of the present invention is to provide a new baking utensil for the handling of bakery pans, and particularly for the handling of pizza pans.

Yet another object of the present invention is to provide a new baking utensil which includes an elongate lower arm with a pan supporting end region having a notch being for accepting a lip of a pan. Extending from the pan supporting end region is a pan stopping flange. An elongate upper arm having a pan grabbing end region at one end is pivotally coupled to the lower arm at its other end so that the upper arm is pivotable between an open position and a closed position. Extending from the pan grabbing end region is a pan grabbing flange which is positioned in relation to the pan stopping flange such that a lip extending from a pan is held between the pan grabbing flange and the pan stopping flange when the upper arm is positioned in the closed position.

Still yet another object of the present invention is to provide a new baking utensil that allows a pizza baker to efficiently retrieve and remove with one easy movement a pizza pan from a pizza oven.

Even still another object of the present invention is to provide a new baking utensil that extends a baker's effective reach to safely handle pizza pans in a pizza oven.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a partial side view taken along line 3—3 of FIG. 2 of the flat pan grabbing end region of the upper arm.

FIG. 4 is a partial side view taken from line 4—4 of FIG. 2 of the flat pan supporting end region of the lower arm.

FIG. 5 is a cross sectional view of the spring bias taken from line 5—5 of FIG. 2.

FIG. 6 is a cross sectional view of the present invention taken from line 6—6 of FIG. 5.

DESCRIPTION OF THE PREFERRED EMBODIMENT

Figure 1:
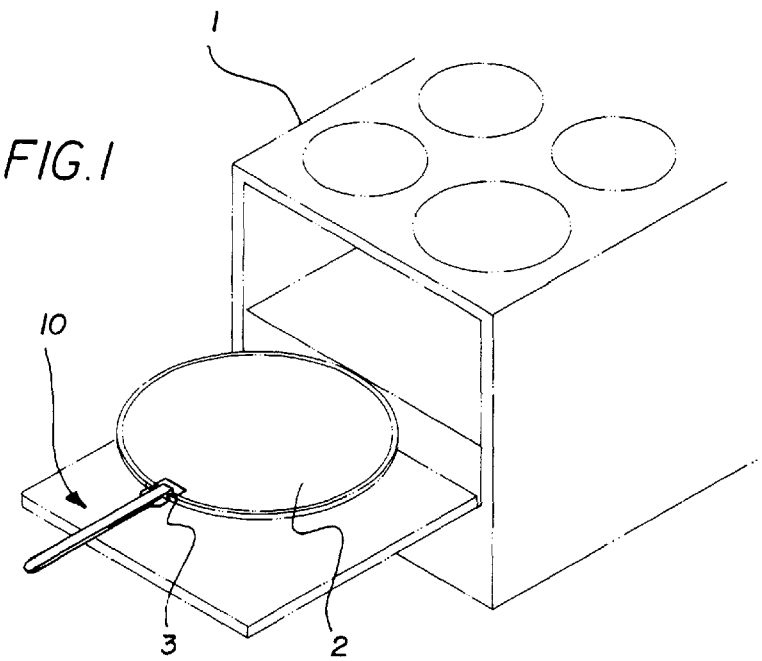
FIG. 1 is a perspective view of a new baking according to the present invention utensil in use handling a pizza pan.
Figure 2:
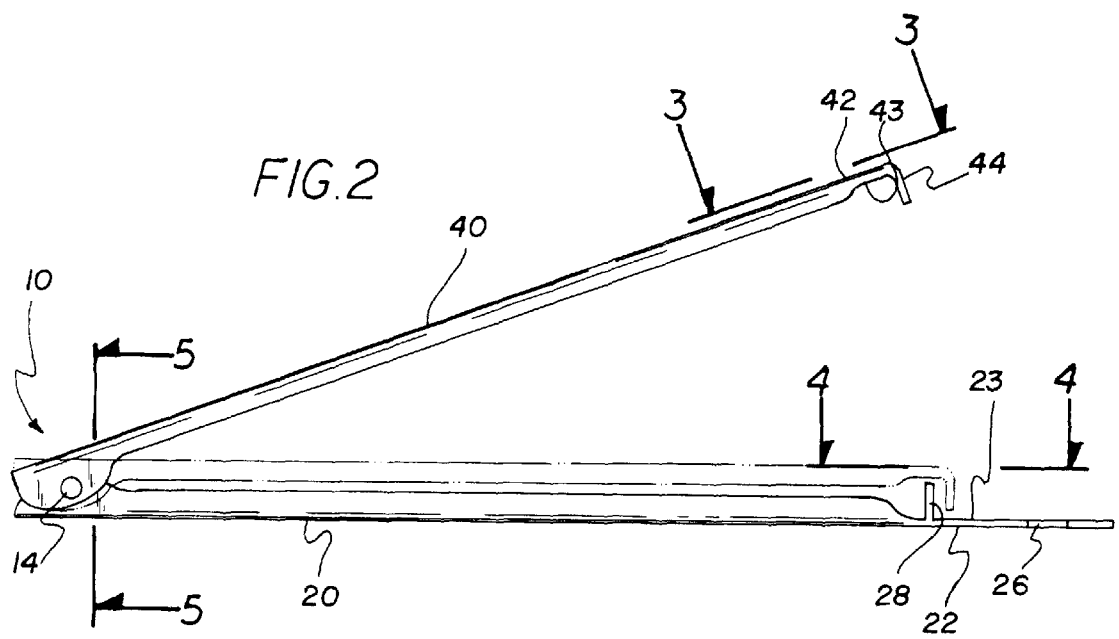
FIG. 2 is a side view of the baking utensil in an open position.
Figure 7:
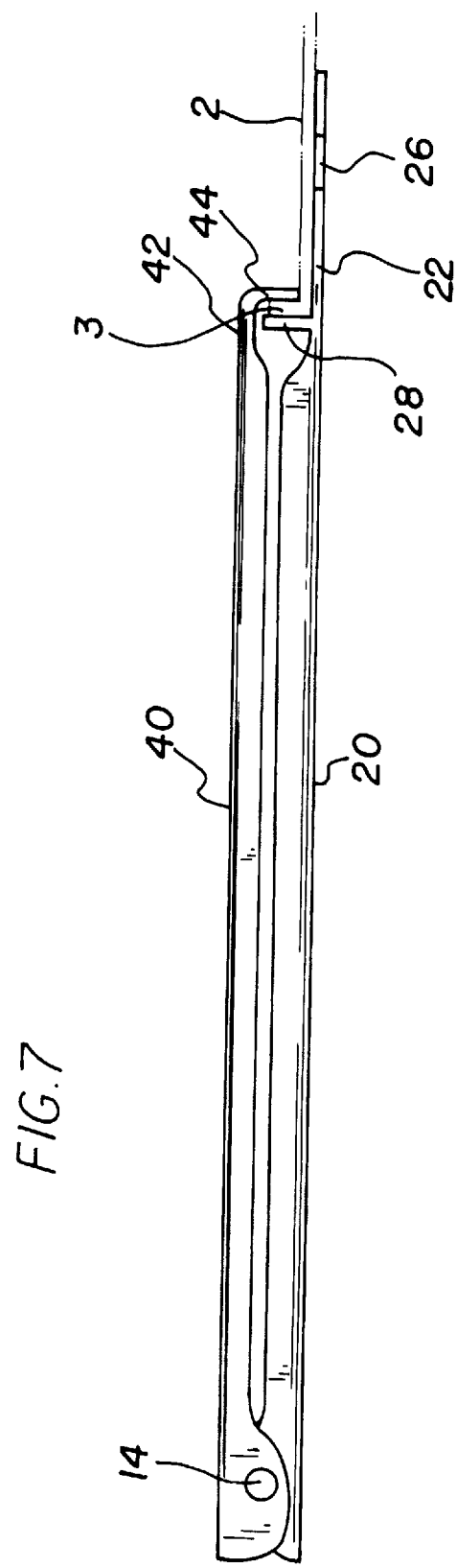
FIG. 7 is a side view of the present invention in a closed position.

With reference now to the drawings, and in particular to FIGS. 1 through 7 thereof, a new baking utensil embodying the principles and concepts of the present invention and generally designated by the reference numeral 10 will be described.

As best illustrated in FIGS. 1 through 7, the baking utensil 10 comprises an elongate lower arm 20 with a pan supporting end region 22 having a notch 26 for accepting a lip 3 of a pan 2. Extending from the pan supporting end region 22 is a pan stopping flange 28. An elongate upper arm 40 having a pan grabbing end region 42 at one end is pivotally coupled 14 to the lower arm 20 at its other end so that the upper arm 40 is pivotable between an open position and a closed position. Extending from the pan grabbing end region 42 is a pan grabbing flange 44 which is positioned in relation to the pan stopping flange 28 such that a lip 3 extending from a pan 2 is held between the pan grabbing flange 44 and the pan stopping flange 28 when the upper arm is positioned in the closed position.

Preferably, both arms 20, 40 are elongated to provide maximum reach for greater efficiency and reduced risk of burns when reaching into an oven 1. Preferably, the elongated lower arm 20 has a pan supporting end region 22 which is flat to aid the sliding of the pan supporting end region 22 under the pan 2. Ideally, the pan supporting end region 22 has a plurality of arcuate pan stopping flanges 28 extending upwardly from the upper surface 23 of the pan supporting end region 22. Each of the pan supporting end region sides 24 has a notch 26 for accepting a lip 3 of a pan 2 to permit maneuvering of the pan 2 by the baking utensil 10.

Ideally, the elongated upper arm 40 has a pan grabbing end region 42 that is flat. The pan grabbing flange 44 extends downwardly from the lower surface 43 of the pan grabbing end region 22. Ideally, the pan stopping flange 28 and the pan grabbing flange 44 are arcuate in shape to hold an arcuate lip 3 of a pan 2. The pan stopping flanges 28 are positioned in relation to the pan grabbing flange 44 such that a lip 3 extending from the perimeter of a pan 2 is held between the pan grabbing flange 44 and the pan stopping flanges 28 when the upper arm 40 is positioned in the closed position.

The other end of the elongated upper arm 40 is pivotally coupled 14 to the lower arm 20 to allow pivoting of the upper arm 40 between an open position and a closed position. When in the closed position, the upper arm 40 is substantially parallel to the lower arm 20.

The upper arm 40 is also biased towards the open position by a spring 12.

In use, the baking utensil 10 is used to maneuver a pan 2 having a lip 3 in an oven 1 by inserting the lip 3 of a pan 2 within the notch 26 on the pan supporting end region 22.

The baking utensil 10 may also be used to lift and carry a pan 2 with a lip 3 by sliding the lower arm 20 pan supporting end region 22 under a pan 2 until the lip 3 of the pan abuts the pan stopping flange 28, then positioning the upper arm 40 in the closed position to hold the lip 3 of the pan between the pan grabbing flange 44 and the pan stopping flange 28, and lifting the pan 2 by the baking utensil 10 to remove the pan 2 from the oven 1.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A baking utensil comprising:
   an elongate lower arm having first and second ends and a lower surface being extended between said ends, said lower arm having a pan supporting end region at its second end, said lower surface of said lower arm being substantially planar, said pan supporting end region having a support portion;
   a pan stopping flange being extended from said pan supporting end region;
   an elongate upper arm having opposite ends, an upper surface, and a pan grabbing end region at one end, said upper arm being hingedly coupled to said first end of said lower arm at its other end, said upper arm being pivotable between an open position and a closed position, said upper surface of said upper arm being substantially planar;
   a pan grabbing flange being extended from said pan grabbing end region, said pan stopping flange being positioned in relation to said pan grabbing flange such that a lip extending from a pan is held between said pan grabbing flange and said pan stopping flange when said upper arm is positioned in said closed position; and
   wherein said pan supporting end region has a notch being for accepting a lip of a pan;
   wherein said pan supporting end region has a pair of opposing sides, said notch being located on one of said sides;
   further comprising an additional notch, said additional notch being located on the other of said pan supporting end region sides.

2. The baking utensil of claim 1 wherein said pan supporting end region has an upper surface, said pan stopping flange being upwardly extended from the upper surface of said pan supporting end region.

3. The baking utensil of claim 1 wherein said pan stopping flange and said pan grabbing flange are arcuate in shape to hold an arcuate lip of a pan.

4. The baking utensil of claim 1 wherein said upper arm pan grabbing end region is flat and has a lower surface, said pan grabbing flange being downwardly extended from said pan grabbing end region lower surface.

5. The baking utensil of claim 1 wherein said upper arm is biased towards said open position, said biasing being such that the angle formed between said upper surface of said upper arm and said lower surface of said lower arm is at least fifteen degrees when said upper arm is in said open position.

6. The baking utensil of claim 1 wherein said upper arm is biased towards said open position by a spring.

7. The baking utensil of claim 1, wherein said notches are substantially rectangular shaped.

8. The baking utensil of claim 1 wherein said lower arm has a plurality of pan stopping flanges, said pan stopping flanges being positioned in relation to said pan grabbing flange such that a lip extending from the perimeter of a pan is held between said pan grabbing flange and said pan stopping flanges when said upper arm is positioned in said closed position, wherein said pan is forced against said support portion of said pan supporting end region of said lower arm by said pan grabbing end region of said upper arm when said upper arm is positioned in said closed position.

9. A baking utensil of claim 1, comprising:
   an elongate lower arm having first and second ends and a lower surface being extended between said ends, said lower arm having a pan supporting end region at its second end, said lower surface of said lower arm being substantially planar, said pan supporting end region having a support portion;
   a pan stopping flange being extended from said pan supporting end region;
   an elongate upper arm having opposite ends, an upper surface, and a pan grabbing end region at one end, said upper arm being hingedly coupled to said first end of said lower arm at its other end, said upper arm being pivotable between an open position and a closed position, said upper surface of said upper arm being substantially planar;
   a pan grabbing flange being extended from said pan grabbing end region, said pan stopping flange being positioned in relation to said pan grabbing flange such that a lip extending from a pan is held between said pan grabbing flange and said pan stopping flange when said upper arm is positioned in said closed position; and
   wherein said pan supporting end region has a notch being for accepting a lip of a pan; and
   wherein said lower arm has a plurality of pan stopping flanges, said pan stopping flanges being positioned in relation to said pan grabbing flange such that a lip extending from the perimeter of a pan is held between said pan grabbing flange and said pan stopping flanges when said upper arm is positioned in said closed position, wherein said pan is forced against said support portion of said pan supporting end region of said lower arm by said pan grabbing end region of said upper arm when said upper arm is positioned in said closed position.

10. The baking utensil of claim 9 wherein said pan supporting end region has a pair of opposing sides, said notch being located on one of said sides.

11. The baking utensil of claim 9 wherein said notch is substantially rectangular shaped.

12. The baking utensil of claim 9 further comprising an additional notch, said additional notch being located on the other of said pan supporting end region sides.

13. The baking utensil of claim 9 wherein said pan supporting end region has an upper surface, said pan stopping flange being upwardly extended from the upper surface of said pan supporting end region.

14. The baking utensil of claim 9 wherein said pan stopping flange and said pan grabbing flange are arcuate in shape to hold an arcuate lip of a pan.

15. The baking utensil of claim 9 wherein said upper arm pan grabbing end region is flat and has a lower surface, said pan grabbing flange being downwardly extended from said pan grabbing end region lower surface.

16. The baking utensil of claim 9 wherein said upper arm is biased towards said open position, said biasing being such that the angle formed between said upper surface of said upper arm and said lower surface of said lower arm is at least fifteen degrees when said upper arm is in said open position.

17. The baking utensil of claim 16 wherein said upper arm is biased towards said open position, said biasing being such that the angle formed between said upper surface of said upper arm and said lower surface of said lower arm is at least fifteen degrees when said upper arm is in said open position.

18. The baking utensil of claim 9 wherein said upper arm is biased towards said open position by a spring.

19. A baking utensil, comprising:
   an elongate lower arm having first and second ends, a flat pan supporting end region at its second end, and a lower surface being extended between said ends, said pan supporting end region having an upper surface, a pair of opposing sides, and a support portion;

a plurality of arcuate pan stopping flanges being upwardly extended from said pan supporting end region upper surface;

an elongate upper arm having opposite ends, a flat pan grabbing end region at one end, and an upper surface, said pan grabbing end region having a lower surface, said upper arm other end being hingedly coupled to said first end of said lower arm, said upper arm being pivotable between an open position and a closed position, wherein said upper arm is substantially parallel to said lower arm when positioned in said closed position, said upper arm being biased towards said open position, said biasing being such that the angle formed between said upper surface of said upper arm and said lower surface of said lower arm is at least fifteen degrees when said upper arm is in said open position, said upper surface of said upper arm being substantially planar;

an arcuate pan grabbing flange being downwardly extended from said pan grabbing end region lower surface, said pan stopping flanges being positioned in relation to said pan grabbing flange such that a lip extending from the perimeter of a pan is held between said pan grabbing flange and said pan stopping flanges when said upper arm is positioned in said closed position;

wherein said pan is forced against said support portion of said pan supporting end region of said lower arm by said pan grabbing end region of said upper arm when said upper arm is positioned in said closed position; and wherein each of said pan supporting end region sides has a notch being for accepting a lip of a pan.

20. A method of using a baking utensil to remove a pan having a lip from within an oven, comprising the steps of:

providing a baking utensil, comprising:

an elongate lower arm having first and second ends, said lower arm having a pan supporting end region at its second end;

a pan stopping flange being extended from said pan supporting end region;

an elongate upper arm having opposite ends and having a pan grabbing end region at one end, said upper arm being hingedly coupled to said first end of said lower arm at its other end, said upper arm being pivotable between an open position and a closed position;

a pan grabbing flange being extended from said pan grabbing end region, said pan stopping flange being positioned in relation to said pan grabbing flange such that a lip extending from a pan is held between said pan grabbing flange and said pan stopping flange when said upper arm is positioned in said closed position;

wherein said pan supporting end region has a pair of opposing sides; and wherein said pan supporting end has a notch being for accepting a lip of a pan, said notch being located on one of said sides;

inserting a lip of a pan within said lower arm pan supporting end notch;

maneuvering the pan within an oven with said baking utensil;

sliding said lower arm pan supporting end region until the lip of the pan abuts said pan stopping flange;

positioning said upper arm in said closed position to hold the lip of the pan between said pan grabbing flange and said pan stopping flange; and lifting said pan by said baking utensil to remove the pan from the oven.

* * * * *